United States Patent [19]

Bianchetta

[11] 3,967,640
[45] July 6, 1976

[54] HYDRAULIC CONTROL VALVE ASSEMBLY WITH DIVERSE CIRCUIT ADAPTABILITY

[75] Inventor: Donald L. Bianchetta, Coal City, Ill.

[73] Assignee: Caterpillar Tractor Co., Peoria, Ill.

[22] Filed: Jan. 31, 1975

[21] Appl. No.: 545,889

Related U.S. Application Data

[63] Continuation of Ser. No. 419,517, Nov. 28, 1973, abandoned.

[52] U.S. Cl............................ 137/269; 137/596.12; 137/596.13
[51] Int. Cl.² .................... F16K 11/07; F16K 27/04
[58] Field of Search.......... 137/269, 596.12, 596.13, 137/315, 596.16; 29/157.1 R, DIG. 26; 251/366

[56] References Cited

UNITED STATES PATENTS

| | | | |
|---|---|---|---|
| 2,483,651 | 10/1949 | Lee.............................. | 137/596.13 |
| 2,745,433 | 5/1956 | Schneider et al............. | 137/596.13 |
| 3,008,488 | 11/1961 | Vander Kaap et al......... | 137/596.12 |

Primary Examiner—Martin P. Schwadron
Assistant Examiner—Robert J. Miller
Attorney, Agent, or Firm—Phillips, Moore, Weissenberger Lempio & Strabala

[57] ABSTRACT

A hydraulic control valve body is pre-cored for selective adaptation to provide a first valve assembly having two independent circuits or a second valve assembly having a single circuit with either a series-parallel or interrupted series function.

6 Claims, 3 Drawing Figures

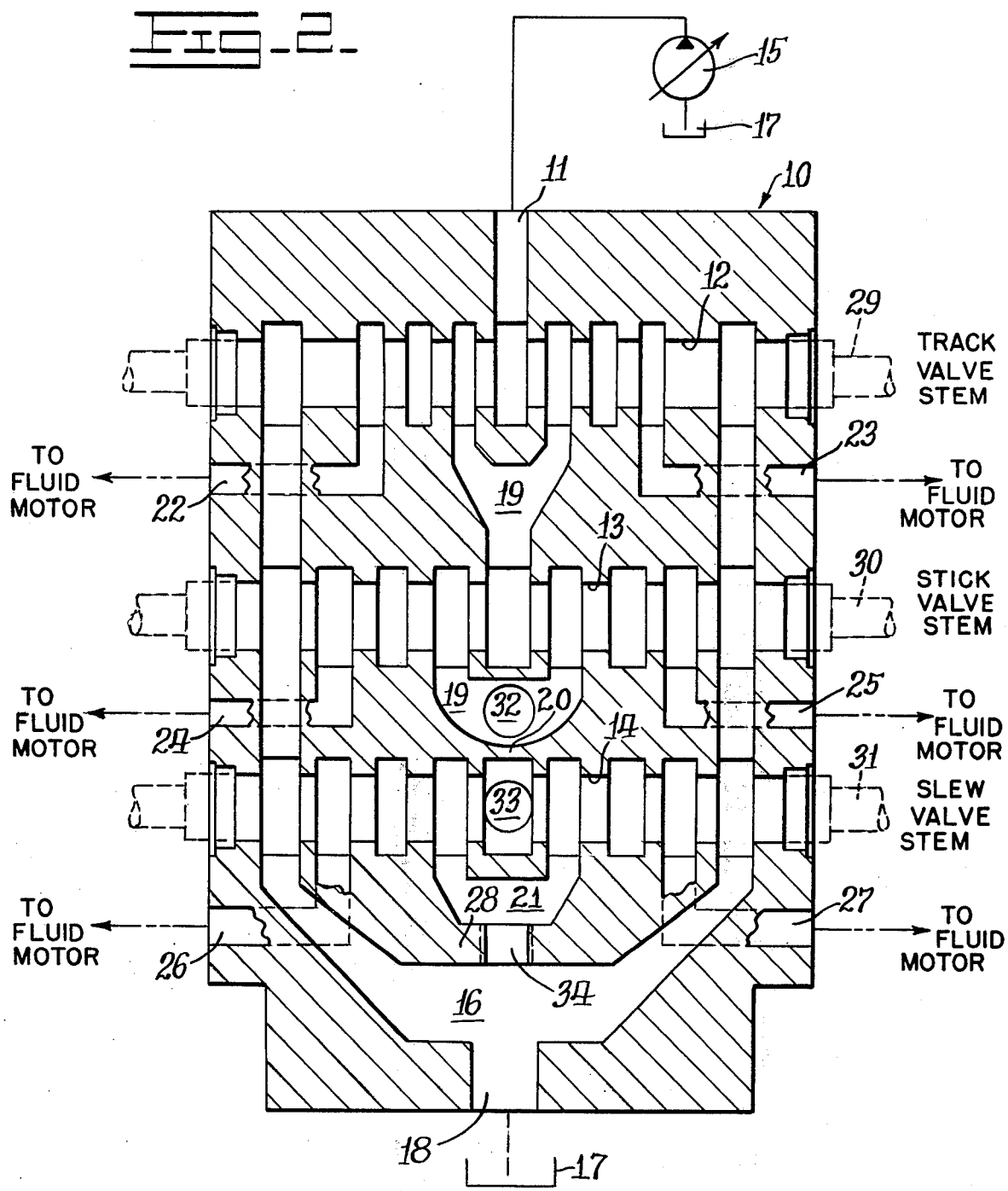

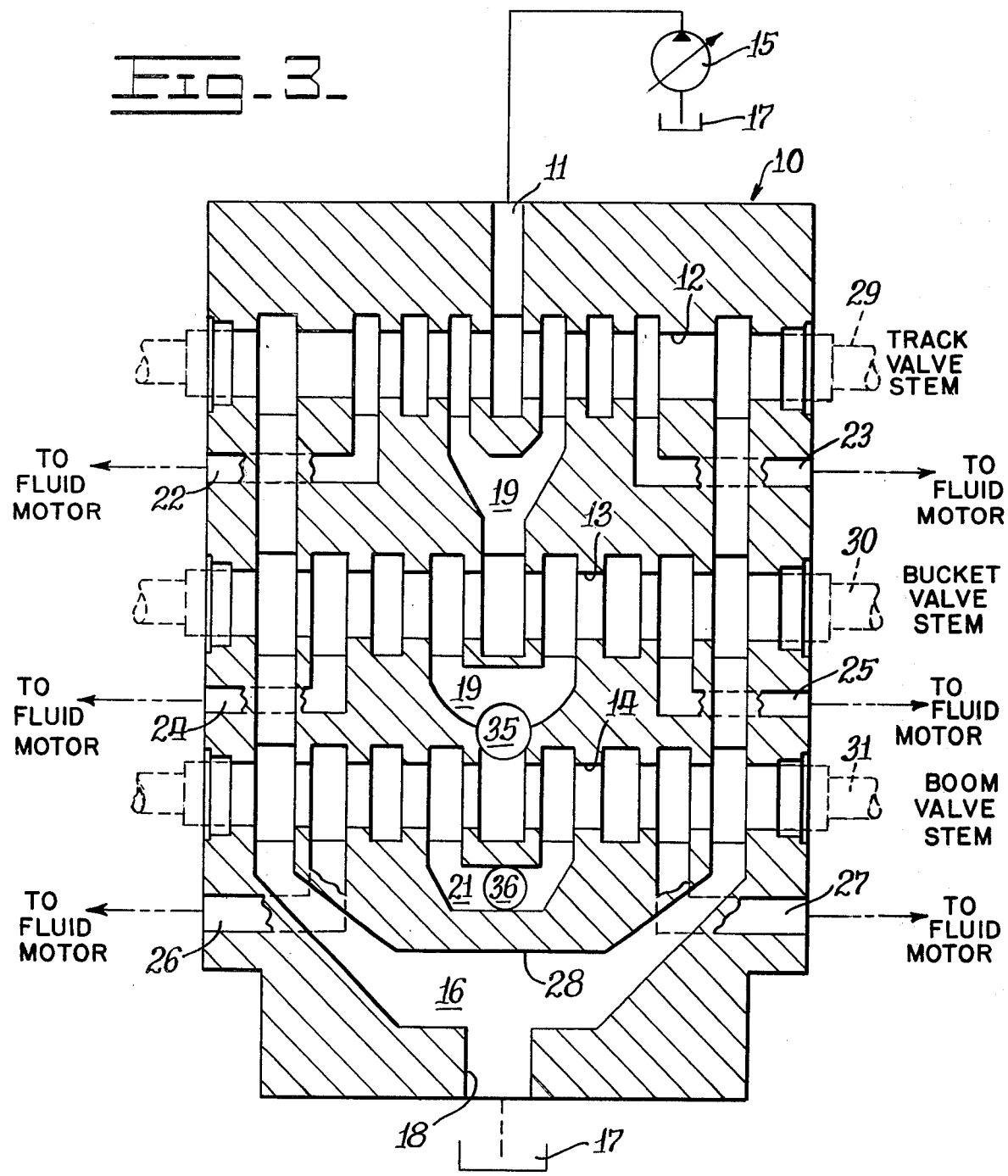

HYDRAULIC CONTROL VALVE ASSEMBLY WITH DIVERSE CIRCUIT ADAPTABILITY

This is a continuation of Ser. No. 419,517, filed Nov. 28, 1973, now abandoned.

BACKGROUND OF THE INVENTION

This invention relates to a hydraulic control valve assembly. In particular, this invention relates to a pre-cored valve body adaptable to provide a first valve assembly having two independent circuits, or a second valve assembly having a single circuit with an interrupted series function.

Conventionally, valve assemblies of the type employed in fluid systems for controlling fluid flow to a plurality of fluid motors comprise a plurality of independent valve units, typically connected in series, for directing fluid flow from a fluid supply source to operate the fluid motors associated with the respective valve units. Such fluid systems frequently have diverse valve function requirements, commonly employing, for example, valve assemblies which provide a plurality of independent circuits within a single valve housing, or which provide a single circuit having multiple interrupted series functions within a single valve housing, according to the requirements of a specific fluid system.

Fluid systems employing valve assemblies of both types are commonly associated with a variety of equipment, including earthworking equipment such as hydraulic excavators and motor graders. Examplary of fluid systems employing both types of valve assemblies is the three-pump hydraulic circuit for a hydraulic excavator described in U.S. Pat. Ser. No. 207,027, by Bridwell, et al filed Dec. 13, 1971, and of common assignment herewith.

At present, valve assemblies are conventionally manufactured as independent units having the desired valve function within each separate unit. Such manufacturing techniques require diversified casting and tooling efforts and involve relatively complicated production and distribution techniques.

Attempts have been made to diversify such specialized valve assemblies for more universal use. For example, the multiple spool valve assembly described in U.S. Pat. No. 3,195,571 and British Pat. No. 835,331 is provided with a carryover fitting effective, inter alia, to establish fluid communication between this and another valve assembly for example, for series operation of a plurality of fluid motors. Also, U.S. Pat. No. 2,868,227 describes a valve housing cored to permit selective blocking of the valve circuits for single or multiple use of the valve assembly.

While the assemblies described attempt to facilitiate single or multiple use of specialized valve units, the valve units per se are not adaptable for use according to valve function requirements of various fluid systems, and afford minimal versatility of function for use under varying system requirements.

BRIEF SUMMARY AND OBJECTS OF THE INVENTION

The invention provides a unitary valve body adaptable to provide one of two circuit arrangements having the desired valve function for a particular fluid system application. The valve body is pre-cored to provide a plurality of valve stem bores and fluid communication passages selectively communicable to provide a first valve assembly having two independent circuits and/or a second valve assembly having a single circuit with an interrupted series function.

It is therefore an object of this invention to provide a pre-cored valve body selectively adaptable for single or double circuit functions.

It is another object of this invention to provide a versatile valve body which can simply and effectively be adapted to diverse fluid system requirements.

It is an additional object of this invention to provide a pre-cored valve body adaptable for use according to fluid system requirements which permits simplification of standard valve production and distribution techniques.

Other object and advantages of the invention will be apparent from the following description and appended claims.

BRIEF DESCRIPTION OF THE DRAWINGS

FIG. 2 is a view of the valve body like FIG. 1, modified to provide a valve body for a first valve assembly having two distinct circuits; and FIG. 3 is a view of the valve body like FIG. 1, modified to provide a valve body for a second valve assembly having a single circuit of three interrupted series functions.

DETAILED DESCRIPTION OF THE DRAWINGS

Figure 1:
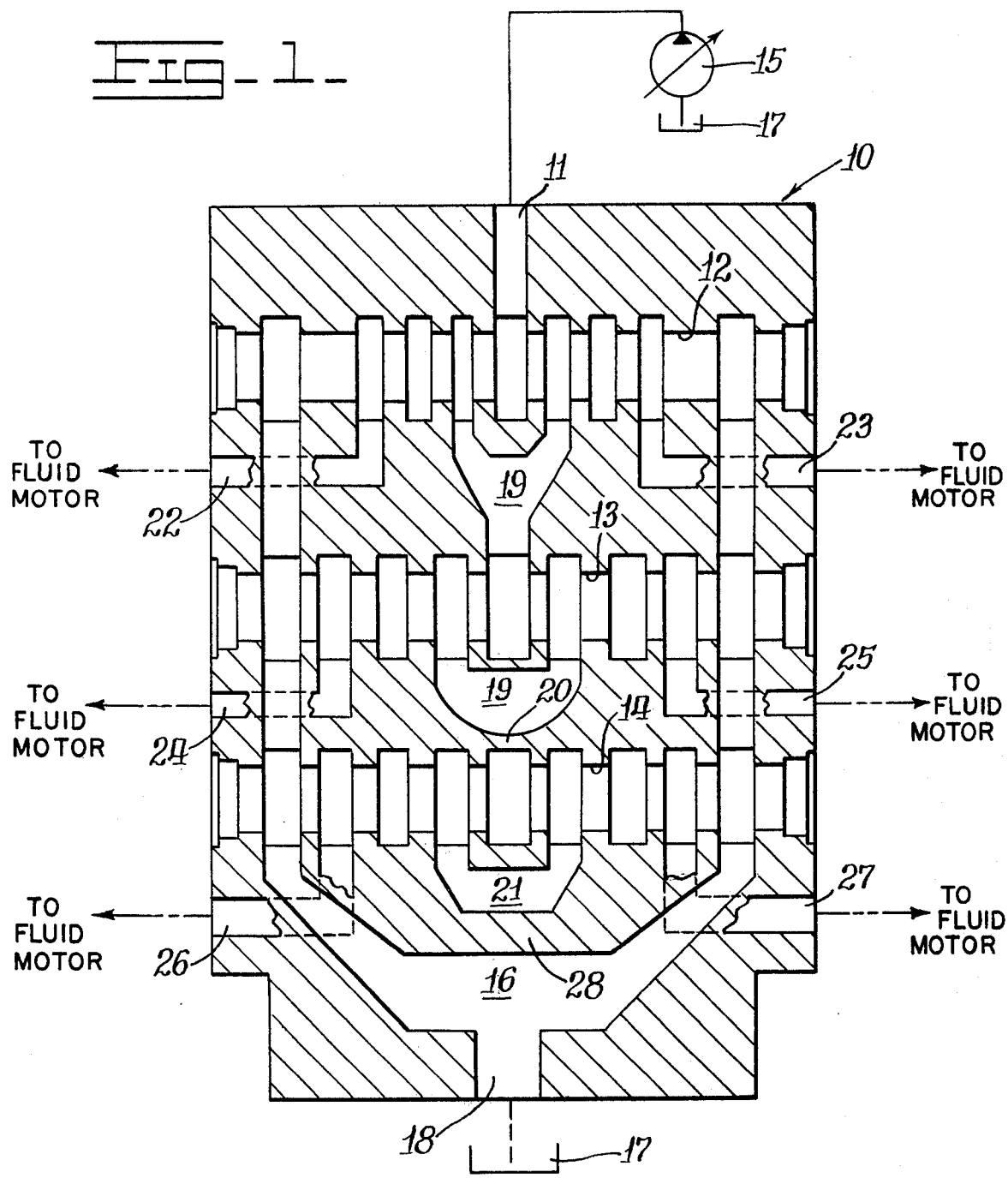
FIG. 1 is a sectional view of a pre-cored valve body in accordance with the present invention.

There is illustrated in FIG. 1 a valve body which includes a three-stem hydraulic valve body casting 10 provided with an inlet 11 and a series of parallel valve spool receiving bores 12, 13 and 14. The inlet 11 is for communicating with a pump 15 which draws fluid from a fluid tank supply or sump 17. A U-shaped tank return passage 16 communicates with a tank 17 via an outlet 18, and two central bypass passages 19 and 21. Each valve stem receiving bore 12, 13 and 14 is in communication respectively with a pair of motor passages 22 and 23; 24 and 25; and 26 and 27 respectively.

As shown in FIG. 1, the central bypass passages 19 and 21 are blocked from communication with each other by means of a removable wall portion 20. The wall or web 20 is removable by virtue of its being located by suitable indicies and having a thickness and configuration enabling it to be removed by a simple drill operation. It should also be noted that these passages are not provided with an outlet to the tank 17 at this time. The passage 21 is blocked by a wall portion 28 from communication with return passage 16. The valve assembly illustrated in FIG. 1 is thus selectively adaptable to either one of the valve assemblies illustrated in FIGS. 2 and 3, as desired; however, the valve assembly of FIG. 1 is not functional as illustrated without adaptation.

With reference to FIGS. 2 and 3, first and second modifications or adaptations of the valve assembly of FIG. 1 are illustrated, providing alternate circuitry in the valve body 10. Each of the three bores 12, 13 and 14 for operation are provided respectively with valve stems 29, 30 and 31 as shown in phantom in FIGS. 2 and 3 for control of typical excavator motor as indicated. In the functional valve assemblies illustrated in FIGS. 2 and 3, the stems 29, 30 and 31 that will be provided control fluid pressure to the motor passages 22 and 23; 24 and 25; and 26 and 27, respectively.

The valve assemblies of FIGS. 2 and 3 are shown with valve stems (shown in phantom) labelled for certain control functions for application, for example, with a hydraulic excavator (not shown), but it is understood that these control functions are variable according to the specific application, and that the control functions indicated in FIGS. 2 and 3 are included by way of illustration only.

With particular reference to FIG. 2, the valve assembly of FIG. 1 is shown modified to provide two distinct circuits comprising a first interrupted series circuit including the valve stems 29 and 30 and a second independent circuit including the valve stem 31. The valve assembly of FIG. 1 is adapted for this function by providing an outlet 32 in the bypass passage 19, to render the first circuit functional. The outlet is formed by drilling a hole at a pre-determined indicated position through the outer wall of the housing into the passage 19. The outlet 32 may be either communicated with the tank 17, or communicated with another valve assembly so that fluid from the first interrupted series circuit valve stems 29 and 30 may be combined with such other valve assembly. The valve assembly of FIG. 1 is further adapted for this function by providing the bore 14 with an inlet port 33, simply by drilling through the housing, and by providing the bypass passage 21 with an outlet port 34 communicating the passage 21 with the return passage 16 and the tank outlet 18. The outlet port 34 is drilled in wall portion 28 between the bypass passage 21 and the tank return passage 16, providing communication between these two passages. The outlet port 34 may be formed by inserting a drill through outlet port 18 to engage wall 28.

The inlet port 33 is then connected to an independent fluid pump (not shown), and the circuit including the valve stem 31 is independent of the circuit including the valve stems 29 and 30.

With particular reference now to FIG. 3, the valve assembly of FIG. 1 is shown modified and adapted to provide a single circuit with the three valve stems 29, 30 and 31 in interrupted series arrangement. The valve assembly of FIG. 1 is adapted for this function by providing a communicating passage 35 between the bypass passages 19 and 21, and by providing an outlet port 36 in the bypass passage 21.

The communicating passage 35 is preferably formed by drilling the housing at a pre-determined indicated position to remove wall 20 between the bypass passages 19 and 21. The outer end of hole 35 is then plugged where it penetrates the valve body 10. The outlet port 36 is similarly formed by drilling and may be connected to another valve to provide high pressure carryover fluid to such other valve circuit.

Other variations and modifications are possible from the basic valve body and the illustrated modifications. For example, passages 34 and 36 may both be provided in both FIG. 2 and FIG. 3 and the one not needed for the particular circuit may be plugged in a suitable manner.

Thus, from the above description it is seen that I have provided a valve body that is readily adaptable to diverse circuit requirements simply by drilling holes to provide communicating ports at pre-selected positions in the valve body. This invention provides means whereby only a single valve body need be stocked to supply a number of different circuit requirements.

What is claimed is:

1. A pre-cored valved body comprising:
first and second identical, adjacently positioned valve spool receiving bore means for receiving identical valve spool means, each said bore means including first and second motor port means for communicating with a double-acting fluid motor;
said bore means adapted to receive identical valve spool means for cooperating with said bore means for controlling communication of fluid between said bore means and said motor port means;
first and second central bypass passage means for separately communicating respectively with said first and second bore means;
inlet means for communicating one of said bore means with fluid supply source;
return passage means for communicating with each of said bore means for communicating return fluid to a sump;
removable wall means for separating said first and said second bore means at said central bypass passage means; and,
said valve body constituting means for providing a first valve assembly having one valve circuit by removal of said wall portion for communication of said central bypass passages and said bores, and for providing a second valve assembly by retaining said wall portion and by provision of second inlet means for communicating fluid to said second bore means and second outlet means for communicating said first bore means with a sump, wherein said valve body is formed into said first valve assembly having two independent circuits comprising an outlet formed in said first central bypass passage communicating said first central bypass passage with the exterior of said valve body, and having an inlet formed in said second central bypass passage communicating said second central bypass passage with a fluid supply source, and further having an outlet passage formed in a second wall communicating said second bypass passage with said tank return passage.

2. A pre-cored valve body comprising:
first and second identical, adjacently positioned valve spool receiving bore means for receiving identical valve spool means, each said bore means including first and second motor port means for communicating with a double-acting fluid motor;
said bore means adapted to receive identical valve spool means for cooperating with said bore means for controlling communication of fluid between said bore means and said motor port means;
first and second central bypass passage means for separately communicating respectively with said first and second bore means;
inlet means for communicating one of said bore means with fluid supply source;
return passage means for communicating with each of said bore means for communicating return fluid to a sump;
removable wall means for separating said first and said second bore means at said central bypass passage means; and,
said valve body constituting means for providing a first valve assembly having one valve circuit by removal of said wall portion for communication of said central bypass passages and said bores, and for providing a second valve assembly by retaining said wall portion and by provision of second inlet means for communicating fluid to said second bore means and second outlet means for communicating said first bore means with a sump, and wherein said valve body is formed into said second valve assembly having a single circuit with an interrupted series function comprising a passage formed in said removable wall means communicating said first central bypass passage with said second valve stem receiving bore and having an outlet formed in said second central bypass passage communicating said second central bypass passage with the exterior of said valve body.

3. A pre-cored valve body for defining either one of a single series circuit or two separate circuits, said housing defining:

at least first and second adjacently positioned substantially identical valve stem receiving bore means for receiving identical valve stem means;

a pair of fluid motor ports communicating with each of said bore means;

said bore means adapted to receive identical valve stem means for cooperating with said bore means for controlling communication of fluid to and from said motor ports;

first inlet means for communicating said first bore means with a first fluid supply source;

first bypass passage means for communicating with said first bore means at the center thereof and for bypassing valve stem means disposed in said bore means in a neutral position therein;

second bypass passage means for communicating with said second bore means at the center thereof for bypassing valve stem means disposed therein in a neutral position;

first removable wall means for separating said first bypass passage means and said second bypass passage means;

tank return passage means having an outlet for communicating with a fluid return line;

second removable wall means for separating said second bore means from said tank return passage means;

said valve body constituting means for providing a first valve assembly having two independent circuits by forming an outlet in said first central bypass passage for communicating said first bypass passage with a fluid return link, and providing a second inlet for communicating said second bypass passage with a second fluid supply source, and by forming a passage in said second wall means for communicating said second bypass passage with said tank return passage; and, said valve body further constituting means for providing a single interrupted series circuit with an interrupted series function by removing at least a portion of said first removable wall means for defining a passage in said first wall for communicating said first central bypass passage with said second receiving valve stem bore and by forming an outlet in said second central bypass passage, wherein said passage formed in said first wall is formed by drilling a hole through the exterior of said valve body to intersect and remove at least a portion of said wall and subsequently partially plugging the exterior of said hole.

4. A pre-cored valve body comprising:

first and second identical, adjacently positioned valve spool receiving bore means for receiving identical valve spool means, each said bore means including first and second motor port means for communicating with a double-acting fluid motor;

said bore means adapted to receive identical valve spool means for cooperating with said bore means for controlling communication of fluid between said bore means and said motor port means;

first and second central bypass passage means for separately communicating respectively with said first and second bore means;

inlet means for communicating one of said bore means with fluid supply source;

substantially U-shaped return passage means having separate legs for communicating with each of said bore means adjacent each end thereof outward of said motor port means for communicating return fluid to a sump;

wall means for completely separating said first and said second bore means between the intersection of said return passage therewith, and including a removable wall portion at said central bypass passage means; and, said valve body being cast formed into a unitary body constituting means for providing a first valve assembly having one valve circuit by drilling a hole through the body from the exterior thereof for intersecting and removal of said wall portion for communication of said central bypass passages and said bores, and for providing a second valve assembly by retaining said wall portion and by provision of second inlet means by drilling a hole from the exterior of said valve body for communicating fluid to said second bore means and providing second outlet means by drilling a hole from the exterior of said valve body for communicating said first bore means with a sump.

5. The valve body of claim 1 wherein said outlet formed in said first central bypass passage is formed by drilling a hole through the exterior wall of said valve body into said first central bypass passage;

said inlet formed in said second central bypass passage is formed by drilling a hole through the exterior wall of said valve body into said second central bypass passage; and, said outlet passage is formed by drilling through said second wall from said tank return passage.

6. The valve body of claim 2 wherein said passage communicating said first bypass passage with said second valve stem receiving bore is formed by drilling a hole through the exterior of said valve body intersecting and removing a portion of said removable wall means; and, said outlet communicating said second central bypass passage is formed by drilling a hole through the exterior of said valve body without communicating with said return passage.

* * * * *